(12) United States Patent
Liu

(10) Patent No.: US 12,074,964 B2
(45) Date of Patent: Aug. 27, 2024

(54) ELECTRONIC DEVICE AND METHOD FOR PACKAGING BLOCKS OF BLOCKCHAIN

(71) Applicant: HON HAI PRECISION INDUSTRY CO., LTD., New Taipei (TW)

(72) Inventor: Shiaw-Herng Liu, New Taipei (TW)

(73) Assignee: HON HAI PRECISION INDUSTRY CO., LTD., New Taipei (TW)

( * ) Notice: Subject to any disclaimer, the term of this patent is extended or adjusted under 35 U.S.C. 154(b) by 530 days.

(21) Appl. No.: 17/347,881

(22) Filed: Jun. 15, 2021

(65) Prior Publication Data

US 2021/0391980 A1     Dec. 16, 2021

(30) Foreign Application Priority Data

Jun. 15, 2020   (CN) .......................... 202010544660.1

(51) Int. Cl.
*H04L 9/06* (2006.01)
*G06F 7/58* (2006.01)
(Continued)

(52) U.S. Cl.
CPC .............. *H04L 9/0643* (2013.01); *G06F 7/58* (2013.01); *G06F 16/27* (2019.01); *H04L 9/50* (2022.05)

(58) Field of Classification Search
CPC ....... H04L 9/0643; H04L 9/50; H04L 9/3239; G06F 7/58; G06F 16/27; G01S 19/42; G06Q 20/389; G06Q 40/04
See application file for complete search history.

(56) References Cited

U.S. PATENT DOCUMENTS

2012/0226889 A1*  9/2012  Merriman ........... G06F 16/2255
                                                711/216
2018/0315309 A1*  11/2018  Becker .................. G08G 1/133
(Continued)

FOREIGN PATENT DOCUMENTS

| CN | 106296191 | 1/2017 |
| CN | 109242299 | 1/2019 |
| CN | 110933091 | 3/2020 |

OTHER PUBLICATIONS

LIU Yi-Zhong et al., "Overview on Blockchain Consensus Mechanisms", Journal of Cryptologic Research, 2019, vol. 6, No. 4, pp. 395-432.
(Continued)

*Primary Examiner* — Taghi T Arani
*Assistant Examiner* — Blake I Narramore
(74) *Attorney, Agent, or Firm* — ScienBiziP, P.C.

(57) ABSTRACT

A method for packaging blocks of a blockchain implemented in an electronic device. The method identifies whether a packaged block is valid, and extracts from a header of valid packaged block geographic location information of the submitting blockchain node. A mining difficulty of the electronic device is calculated according to the geographic location information of the electronic device and the blockchain node, and a random number is generated. A hash value is calculated according to the random number and a determination made as to whether the calculated hash value conforms to the mining difficulty. If the calculated hash value is determined to conform to the mining difficulty, the geographic location information of the electronic device is encoded into a new block and the new block is written into the blockchain.

16 Claims, 4 Drawing Sheets

(51) Int. Cl.
*G06F 16/27* (2019.01)
*H04L 9/00* (2022.01)

(56) References Cited

U.S. PATENT DOCUMENTS

| | | | |
|---|---|---|---|
| 2019/0318359 A1* | 10/2019 | Arora | G06Q 20/20 |
| 2020/0082401 A1* | 3/2020 | Arora | G06Q 20/382 |
| 2020/0202651 A1* | 6/2020 | Singh | H04L 9/0643 |
| 2020/0235911 A1* | 7/2020 | Safak | H04L 9/3247 |
| 2020/0288284 A1* | 9/2020 | Klein | H04W 12/63 |
| 2020/0294128 A1* | 9/2020 | Cella | H04L 9/3239 |
| 2020/0322155 A1* | 10/2020 | Cohen | H04L 9/3247 |
| 2021/0004923 A1* | 1/2021 | Mackenzie | G06F 16/27 |
| 2022/0229577 A1* | 7/2022 | Liu | G06F 3/0647 |

OTHER PUBLICATIONS

Li He et al., "Blockchain Technology: Financial Application Practice", Beijing University of Aeronautics and Astronautics Press, Sep. 2017, pp. 101-106.

* cited by examiner

ELECTRONIC DEVICE AND METHOD FOR PACKAGING BLOCKS OF BLOCKCHAIN

CROSS-REFERENCE TO RELATED APPLICATIONS

This application claims priority to Chinese Patent Application No. 202010544660.1 filed on Jun. 15, 2020, the contents of which are incorporated by reference herein.

FIELD

The subject matter herein generally relates to recording by blockchain, and particularly to an electronic device and method for packaging blocks of a blockchain.

BACKGROUND

A blockchain is a type of decentralized record, and can safely store digital currency transactions or other data, as information in the blockchain cannot be counterfeited or tampered because the same blockchain is recorded on so many separate computers. Transaction confirmation on the blockchain is performed by all nodes on the blockchain, and consistency of blocks is ensured by a common recognition algorithm. In an encrypted currency application, such as bit currency, the blockchain stores information of transacting users, and in an intelligent contract application such as Ethereum, the blockchain stores an intelligent contract of the transacting users. However, large blockchain mineral fields build a large number of mining computers in same regions for mining bitcoins, so that probability of success of mining bitcoins in the same regions is greatly improved, which is against the feature of decentralization of the blockchain.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
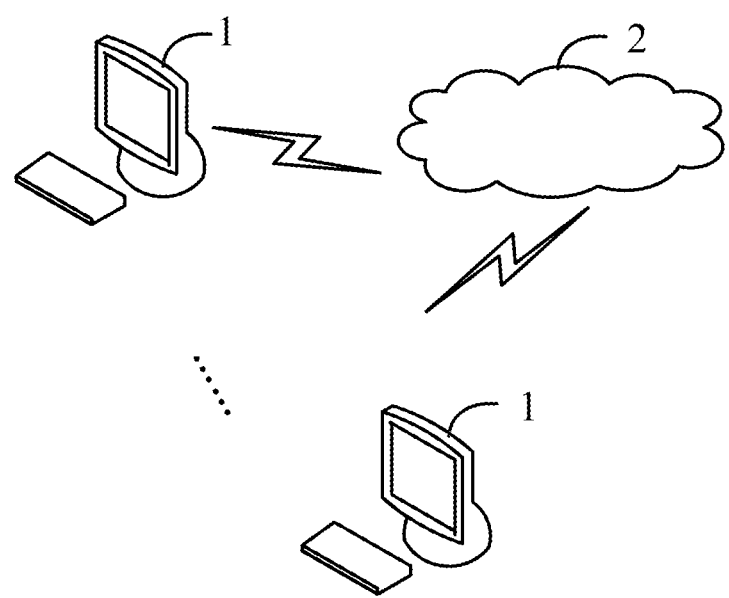
FIG. 1 is a schematic view of an embodiment of an application environment of an electronic device according to the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the presented disclosure.

The presented disclosure, including the accompanying drawings, is illustrated by way of examples and not by way of limitation. Several definitions that apply throughout this disclosure will now be presented. It should be noted that references to "an" or "one" embodiment in this disclosure are not necessarily to the same embodiment, and such references mean "at least one."

Furthermore, the term "module", as used herein, refers to logic embodied in hardware or firmware, or to a collection of software instructions, written in a programming language, such as Java, C, or assembly. One or more software instructions in the modules can be embedded in firmware, such as in an EPROM. The modules described herein can be implemented as either software and/or hardware modules and can be stored in any type of non-transitory computer-readable medium or another storage device. Some non-limiting examples of non-transitory computer-readable media include CDs, DVDs, BLU-RAY, flash memory, and hard disk drives. The term "comprising" means "including, but not necessarily limited to"; it in detail indicates open-ended inclusion or membership in a so-described combination, group, series, and the like.

Referring to FIG. 1, an electronic device 1 can communicate with other electronic devices through network. In one embodiment, the network can be wired network or wireless network. The wireless network can be radio, WI-FI, cellular, satellite, broadcast, etc.

In one embodiment, the electronic device 1 can be a personal computer or a server, the server can be a single server, a server cluster, or a cloud server. A blockchain 2 is formed by a number of electronic devices, and each electronic device can be a node on the blockchain 2.

Figure 2:
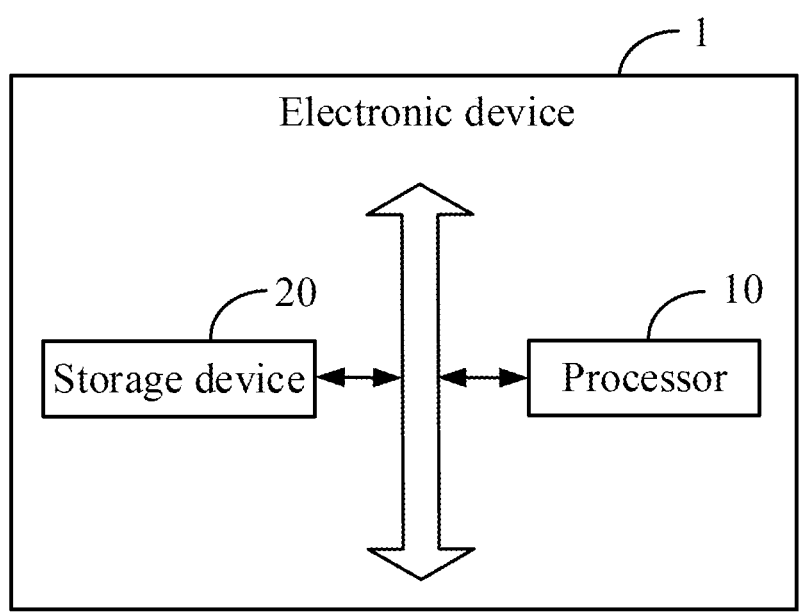
FIG. 2 is a block diagram of an embodiment of an electronic device according to the present disclosure.

FIG. 2 illustrates the electronic device 1 in one embodiment. The electronic device 1 includes, but is not limited to, a processor 10 and a storage device 20. FIG. 2 illustrates only one example of the electronic device 1. Other examples can include more or fewer components than as illustrated or have a different configuration of the various components.

The processor 10 can be a central processing unit (CPU), a microprocessor, or other data processor chip that performs functions in the electronic device 1.

In one embodiment, the storage device 20 can include various types of non-transitory computer-readable storage mediums. For example, the storage device 20 can be an internal storage system, such as a flash memory, a random access memory (RAM) for the temporary storage of information, and/or a read-only memory (ROM) for permanent storage of information. The storage device 20 can also be an external storage system, such as a hard disk, a storage card, or a data storage medium.

Figure 3:
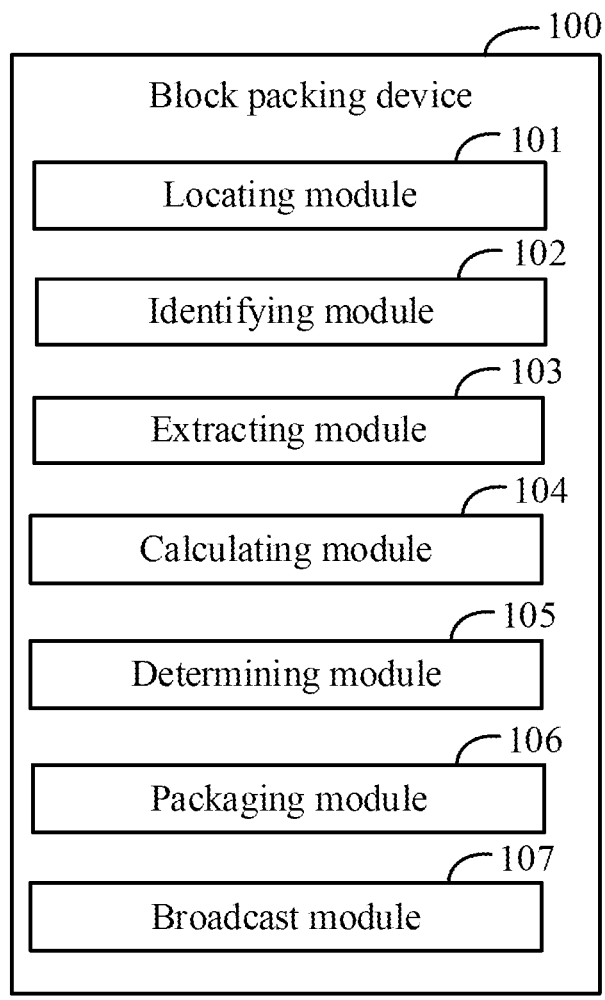
FIG. 3 is a block diagram of an embodiment of a block packaging device according to the present disclosure.

As illustrated in FIG. 3, the electronic device 1 runs a block packaging device 100. The block packaging device 100 at least includes a locating module 101, an identifying module 102, an extracting module 103, a calculating module 104, a determining module 105, a packaging module 106, and a broadcast module 107. The modules 101-107 can be collections of software instructions stored in the storage device 20 of the electronic device 1 and executed by the processor 10. The modules 101-107 also can include functionality represented as hardware or integrated circuits, or as software and hardware combinations, such as a special-purpose processor or a general-purpose processor with special-purpose firmware.

The locating module 101 is configured to locate the electronic device 1 and obtain geographic location information of the electronic device 1.

In one embodiment, the locating module 101 locates the electronic device 1 through a GPS locating system to obtain the geographic location information. The geographic location information can include longitude and latitude information. For example, the geographic location information of the electronic device 1 includes 74 degrees west and 40 degrees north.

The identifying module 102 is configured to identify whether a packaged block received from the blockchain 2 is valid.

In one embodiment, the packaged block can be a block generated by a blockchain node, and when the blockchain node broadcasts the packaged block on the blockchain 2, the electronic device 1 can receive the broadcast packaged block and identify whether the packaged block is a valid block.

In detail, the identifying module 102 identifies whether data structure and syntax of the packaged block is correct, identifies whether a hash value of the packaged block is less than a mining difficulty of the blockchain node, that is, confirms that whether the packaged block contains sufficient workload proof, identifies whether a size of data of the packaging block is within a preset range, for example, the preset range can be 1 megabytes, 3 megabytes, 32 megabytes, or 128 megabytes. The identifying module 102 further identifies whether a first transaction within the packaged block is a coinbase transaction and whether there is only one coinbase transaction within the packaged block. The coinbase transaction is a special transaction generated by the blockchain node itself, used for rewarding miners, and includes block bonus and handling fees. The identifying module 102 further identifies whether the transactions within the packaged block is valid, that is, identifies whether a root hash value of the Merkle tree within the packaged block is equal to the hash Merkle Root in a header of the packaged block.

In one embodiment, if the identifying module 102 determines that all format and content conditions are met, that is, the identifying module 102 determines that the data structure and the syntax of the packaged block is correct, determines that the hash value of the packaged block is less than the mining difficulty of the blockchain node, determines that the size of the packaging block is within the preset range, determines that the first transaction within the packaged block is the coinbase transaction and there is only one coinbase transaction within the packaged block, and determines that the transactions within the packaged block is valid, the identifying module 102 determines that the packaged block is valid.

If the identifying module 102 determines that at least one of the format and the content conditions are not met, that is, the identifying module 102 determines that the data structure or syntax of the packaged block is incorrect, determines that the hash value of the packaged block is greater than or equal to the mining difficulty of the blockchain node, determines that the size of the packaging block is not within the preset range, determines that the first transaction within the packaged block is not the coinbase transaction or there are more than one coinbase transaction within the packaged block, and/or determines that at least one of the transactions within the packaged block is invalid, the identifying module 102 determines that the packaged block is invalid.

If the identifying module 102 identifies that the packaged block is valid, the extracting module 103 is configured to extract the geographic location information of a corresponding blockchain node from a header of the packaged block.

In one embodiment, when a blockchain node writes a block into the blockchain 2, the geographic location information of the blockchain node (i.e. electronic device) is stored in the block header. The extracting module 103 extracts the geographic location information of the corresponding blockchain node from the header of the packaged block. For example, the geographic location information of the blockchain node includes 121 degrees east and 25 degrees north.

In one embodiment, if the identifying module 102 identifies that the packaged block is invalid, the extracting module 103 extracts the geographic location information of a blockchain node corresponding to an immediately-preceding or last valid block from a header of the immediately-preceding or last valid block. The immediately-preceding or last valid block can be a preceding valid block of the packaged block written in the blockchain 2.

The calculating module 104 is configured to calculate a mining difficulty of the electronic device 1 according to the geographic location information of the electronic device 1 and the geographic location information of the blockchain node.

In one embodiment, the calculating module 104 calculates a distance between the electronic device 1 and the blockchain node, according to the geographic location information of the electronic device 1 and the geographic location information of the blockchain node. The calculating module 104 further calculates the mining difficulty according to the distance between the electronic device 1 and the blockchain node, and a theoretical maximum distance between any two blockchain nodes. The mining difficulty can be a 256-bit binary integer.

In one embodiment, if the identifying module 102 identifies that the packaged block is valid, the blockchain node is an electronic device that writes the packaged block into the blockchain 2. If the identifying module 102 identifies that the packaged block is invalid, the blockchain node is an electronic device that writes the preceding valid block into the blockchain 2.

In detail, the calculation module 104 calculates the mining difficulty by the following equation (1):

$$\text{Difficulty} = (1 - Dist/Dist_{Max}) * 2^{256}. \tag{1}$$

In the equation (1), Difficulty is the mining difficulty, Dist is the distance between the electronic device 1 and the blockchain node, and $Dist_{Max}$ is the theoretical maximum distance between the any two blockchain nodes.

For example, if the geographic location information of the electronic device 1 includes 74 degrees east and 40 degrees west, and the geographic location information of the blockchain node includes 121 degrees east and 25 degrees west, the distance Dist between the electronic device 1 and the blockchain node corresponding to the packaging block is 18231 km. The theoretical maximum distance between the any two blockchain nodes is half of an equator length, that is, 20038 km. The mining difficulty of the electronic device 1 can be calculated by Difficulty=$(1-18231/20038)*2^{256}=0.09*2^{256}$.

According to the above equation (1), when the distance between the electronic device 1 and the blockchain node is greater, the smaller is the value of the mining difficulty, and the higher is the success rate of mining. When the distance between the electronic device 1 and the blockchain node is less, the larger is the value of the mining difficulty, and the lower is the success rate of mining.

The calculating module 104 is further configured to generate a random number, and calculate a hash value according to the random number.

In detail, the calculating module 104 composes a hash value of the packaged block and information of a new block into a character string.

In one embodiment, the information of the new block includes basic information and transaction records. The calculating module 104 composes the hash value of the packaged block, the basic information of the new block, and the transaction records of the new block into the character string.

Further, the calculating module 104 generates a random number, adds the random number to an end of the character string to form a new character string, and performs a hash value operation on the new character string to obtain the hash value.

In one embodiment, the calculating module 104 executes a hash algorithm on the character string to obtain the hash value. The hash algorithm can be SHA (Secure Hash Algorithm) 256, the hash value being a binary integer of 256 bits.

The determining module 105 is configured to determine whether the calculated hash value conforms to the mining difficulty.

In one embodiment, the determining module 105 determines whether the hash value is less than or equal to the mining difficulty. If the hash value is less than or equal to the mining difficulty, the determining module 105 determines that the hash value conforms to the mining difficulty. If the hash value is greater than the mining difficulty, the determining module 105 determines that the hash value does not conform to the mining difficulty.

If the determining module 105 determines that the hash value does not conform to the mining difficulty, the calculating module 104 continues to generate another random number, and calculates the hash value according to the another random number until the calculated hash value conforms to the mining difficulty.

If the hash value conforms to the mining difficulty, the packaging module 106 is configured to store the geographic location information of the electronic device 1 into a new block and write the new block into the blockchain 2.

In one embodiment, the packaging module 106 stores the geographic location information and other basic information into the header of the new block, and stores transaction records into the new block, and then writes the new block into the blockchain 2.

The broadcasting module 107 is configured to broadcast the new block before the new block is written into the blockchain 2.

In one embodiment, the broadcasting module 107 transmits the information of the new block packaged by the packaging module 106 to an electronic device of an adjacent blockchain node through the network, and the electronic device of the adjacent blockchain node transmits the information of the new block to an adjacent blockchain node after the new block is identified to be valid, thereby completing broadcasting of the new block. After all blockchain nodes on the blockchain 2 identifies the new block, the packaging module 106 writes the new block into the blockchain 2.

Figure 4:
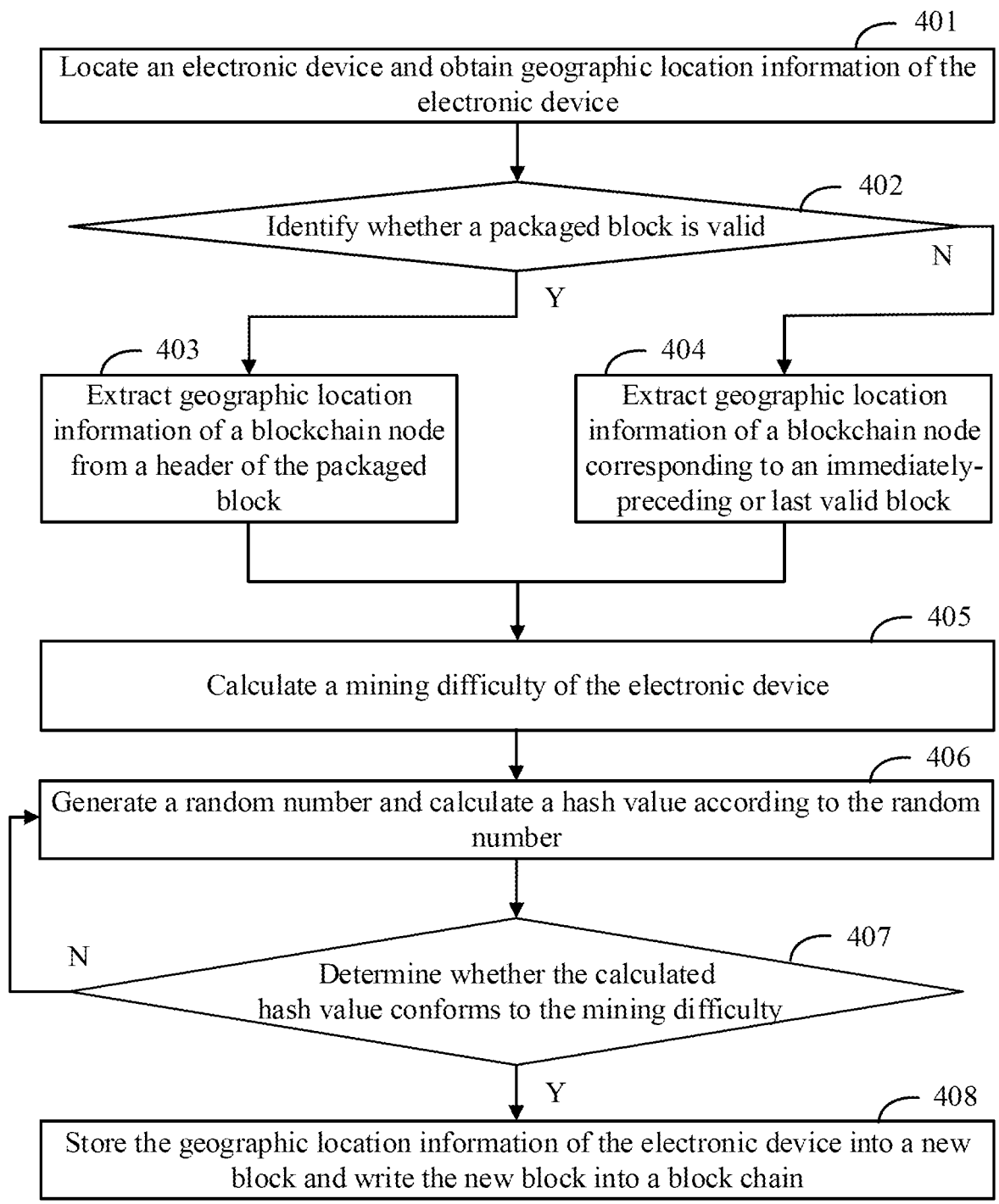
FIG. 4 illustrates a flowchart of an embodiment of a method for packaging blocks of a blockchain according to the present disclosure.

FIG. 4 illustrates a flowchart of an embodiment of a method for packaging blocks of a blockchain. The method is provided by way of example, as there are a variety of ways to carry out the method. The method described below can be carried out using the configurations illustrated in FIGS. 1-3, for example, and various elements of these figures are referenced in explaining the example method. Each block shown in FIG. 4 represents one or more processes, methods, or subroutines carried out in the example method. Furthermore, the illustrated order of blocks is by example only and the order of the blocks can be changed. Additional blocks may be added or fewer blocks may be utilized, without departing from this disclosure. The example method can begin at block 401.

At block 401, the locating module 101 locates the electronic device 1 and obtains geographic location information of the electronic device 1.

In one embodiment, the locating module 101 locates the electronic device 1 through a GPS locating system to obtain the geographic location information. The geographic location information can include longitude and latitude information. For example, the geographic location information of the electronic device 1 includes 74 degrees west and 40 degrees north.

At block 402, the identifying module 102 identifies whether a packaged block received from the blockchain 2 is valid. If the identifying module 102 determines that the packaged block received from the blockchain 2 is valid, the process goes to block 403. If the identifying module 102 determines that the packaged block received from the blockchain 2 is invalid, the process goes to block 404.

In one embodiment, the packaged block can be a block generated by a blockchain node, and when the blockchain node broadcasts the packaged block on the blockchain 2, the electronic device 1 can receive the broadcast packaged block and identify whether the packaged block is a valid block.

In detail, the identifying module 102 identifies whether data structure and syntax of the packaged block is correct, identifies whether a hash value of the packaged block is less than a mining difficulty of the blockchain node, that is, confirms that whether the packaged block contains sufficient workload proof, identifies whether a size of data of the packaging block is within a preset range, for example, the preset range can be 1 megabytes, 3 megabytes, 32 megabytes, or 128 megabytes. The identifying module 102 further identifies whether a first transaction within the packaged block is a coinbase transaction and whether there is only one coinbase transaction within the packaged block. The coinbase transaction is a special transaction generated by the blockchain node itself, used for rewarding miners, and includes block bonus and handling fees. The identifying module 102 further identifies whether the transactions within the packaged block is valid, that is, identifies whether a root hash value of the Merkle tree within the packaged block is equal to the hash Merkle Root in a header of the packaged block.

In one embodiment, if the identifying module 102 determines that all format and content conditions are met, that is, the identifying module 102 determines that the data structure and the syntax of the packaged block is correct, determines that the hash value of the packaged block is less than the mining difficulty of the blockchain node, determines that the size of the packaging block is within the preset range, determines that the first transaction within the packaged block is the coinbase transaction and there is only one coinbase transaction within the packaged block, and determines that the transactions within the packaged block is valid, the identifying module 102 determines that the packaged block is valid.

If the identifying module 102 determines that at least one of the format and the content conditions are not met, that is, the identifying module 102 determines that the data structure or syntax of the packaged block is incorrect, determines that the hash value of the packaged block is greater than or equal to the mining difficulty of the blockchain node, determines that the size of the packaging block is not within the preset range, determines that the first transaction within the packaged block is not the coinbase transaction or there are more than one coinbase transaction within the packaged block, and/or determines that at least one of the transactions within the packaged block is invalid, the identifying module 102 determines that the packaged block is invalid.

At block 403, the extracting module 103 extracts the geographic location information of a corresponding blockchain node from a header of the packaged block.

In one embodiment, when a blockchain node writes a block into the blockchain 2, the geographic location information of the blockchain node (i.e. electronic device) is stored in the block header. The extracting module 103 extracts the geographic location information of the corresponding blockchain node from the header of the packaged block. For example, the geographic location information of the blockchain node includes 121 degrees east and 25 degrees north.

At block 404, the extracting module 103 extracts the geographic location information of a blockchain node corresponding to an immediately-preceding or last valid block. The immediately-preceding or last valid block can be a preceding valid block of the packaged block written in the blockchain 2.

At block 405, the calculating module 104 calculates a mining difficulty of the electronic device 1 according to the geographic location information of the electronic device 1 and the geographic location information of the blockchain node.

In one embodiment, the calculating module 104 calculates a distance between the electronic device 1 and the blockchain node, according to the geographic location information of the electronic device 1 and the geographic location information of the blockchain node. The calculating module 104 further calculates the mining difficulty according to the distance between the electronic device 1 and the blockchain node, and a theoretical maximum distance between two blockchain nodes. The mining difficulty can be a 256-bit binary integer.

In one embodiment, if the identifying module 102 identifies that the packaged block is valid, the blockchain node is an electronic device that writes the packaged block into the blockchain 2. If the identifying module 102 identifies that the packaged block is invalid, the blockchain node is an electronic device that writes the preceding valid block into the blockchain 2.

In detail, the calculation module 104 calculates the mining difficulty by the following equation (1):

$$\text{Difficulty} = (1 - Dist/Dist_{Max}) * 2^{256}. \quad (1)$$

In the equation (1), Difficulty is the mining difficulty, Dist is the distance between the electronic device 1 and the blockchain node, and $Dist_{Max}$ is the theoretical maximum distance between the two blockchain nodes.

For example, if the geographic location information of the electronic device 1 includes 74 degrees east and 40 degrees west, and the geographic location information of the blockchain node includes 121 degrees east and 25 degrees west, the distance Dist between the electronic device 1 and the blockchain node corresponding to the packaging block is 18231 km. The theoretical maximum distance between the two blockchain nodes is half of an equator length, that is, 20038 km. The mining difficulty of the electronic device 1 can be calculated by $\text{Difficulty} = (1-18231/20038)*2^{256} = 0.09*2^{256}$.

According to the above equation (1), when the distance between the electronic device 1 and the blockchain node is greater, the smaller is the value of the mining difficulty, and the higher is the success rate of mining. When the distance between the electronic device 1 and the blockchain node is less, the larger is the value of the mining difficulty, and the lower is the success rate of mining.

At block 406, the calculating module 104 further a random number, and calculate a hash value according to the random number.

In detail, the calculating module 104 composes a hash value of the packaged block and information of a new block into a character string.

In one embodiment, the information of the new block includes basic information and transaction records. The calculating module 104 composes the hash value of the packaged block, the basic information of the new block, and the transaction records of the new block into the character string.

Further, the calculating module 104 generates a random number, adds the random number to an end of the character string to form a new character string, and performs a hash value operation on the new character string to obtain the hash value.

In one embodiment, the calculating module 104 executes a hash algorithm on the character string to obtain the hash value. The hash algorithm can be SHA (Secure Hash Algorithm) 256, the hash value being a binary integer of 256 bits.

At block 407, the determining module 105 determines whether the calculated hash value conforms to the mining difficulty. If the determining module 105 determines that the calculated hash value conforms to the mining difficulty, the process goes to block 408. If the determining module 105 determines that the calculated hash value does not conform to the mining difficulty, the process goes back to block 406.

In one embodiment, the determining module 105 determines whether the hash value is less than or equal to the mining difficulty. If the hash value is less than or equal to the mining difficulty, the determining module 105 determines that the hash value conforms to the mining difficulty. If the hash value is greater than the mining difficulty, the determining module 105 determines that the hash value does not conform to the mining difficulty.

If the determining module 105 determines that the hash value does not conform to the mining difficulty, the calculating module 104 continues to generate another random number, and calculates the hash value according to the another random number until the calculated hash value conforms to the mining difficulty.

At block 408, the packaging module 106 stores the geographic location information of the electronic device 1 into a new block and writes the new block into the blockchain 2.

In one embodiment, the packaging module 106 stores the geographic location information and other basic information into the header of the new block, and stores transaction records into the new block, and then writes the new block into the blockchain 2.

The method further includes: the broadcasting module 107 broadcasts the new block before the new block is written into the blockchain 2.

In one embodiment, the broadcasting module 107 transmits the information of the new block packaged by the packaging module 106 to an electronic device of an adjacent blockchain node through the network, and the electronic device of the adjacent blockchain node transmits the information of the new block to an adjacent blockchain node after the new block is identified to be valid, thereby completing broadcasting of the new block. After all blockchain nodes on the blockchain 2 identifies the new block, the packaging module 106 writes the new block into the blockchain 2.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being embodiments of the present disclosure.

What is claimed is:

1. An electronic device comprising:
   at least one processor; and
   a storage device coupled to the at least one processor and storing instructions for execution by the at least one processor to cause the at least one processor to:
   identify whether a packaged block received from a blockchain is valid;
   extract, in response that the packaged block is identified to be valid, geographic location information of a blockchain node corresponding to the packaged block from a header of the packaged block;
   calculate a mining difficulty of the electronic device according to geographic location information of the electronic device and the geographic location information of the blockchain node, wherein the mining difficulty is a binary integer;
   generate a random number and calculate a hash value according to the random number;
   determine whether the calculated hash value is less than or equal to the mining difficulty;
   store, in response that the calculated hash value is determined to conform to be less than or equal to the mining difficulty, the geographic location information of the electronic device into a new block; and
   write the new block into the blockchain.

2. The electronic device according to claim 1, wherein the at least one processor is further caused to:
   continue to generate another random number in response that the hash value is determined to not conform to the mining difficulty, and
   calculate the hash value according to the another random number until the calculated hash value conforms to the mining difficulty.

3. The electronic device according to claim 1, wherein the at least one processor is further caused to:
   locate the electronic device and obtain the geographic location information of the electronic device, wherein the geographic location information comprises longitude and latitude information.

4. The electronic device according to claim 1, wherein the at least one processor is further caused to:
   extract, in response that the packaged block is identified to be invalid, the geographic location information of a blockchain node corresponding to an immediately-preceding or last valid block.

5. The electronic device according to claim 1, wherein the at least one processor is further caused to:
   calculate a distance between the electronic device and the blockchain node according to the geographic location information of the electronic device and the geographic location information of the blockchain node; and
   calculate the mining difficulty according to the distance between the electronic device and the blockchain node, and a theoretical maximum distance between any two blockchain nodes.

6. The electronic device according to claim 5, wherein the at least one processor is further caused to:
   calculate the mining difficulty according to an equation Difficulty=$(1-\text{Dist}/\text{Dist}_{Max})*2^{256}$, wherein Difficulty is the mining difficulty, Dist is the distance between the electronic device and the blockchain node, and DistMax is the theoretical maximum distance between the any two blockchain nodes.

7. The electronic device according to claim 1, wherein the at least one processor is further caused to:
   compose a hash value of the packaged block and information of the new block into a character string;
   add the random number to an end of the character string to form a new character string; and
   calculate the hash value by performing a hash operation on the new character string.

8. The electronic device according to claim 1, wherein the at least one processor is further caused to:
   determine whether the hash value is less than or equal to the mining difficulty;
   determine, in response that the hash value is determined to be less than or equal to the mining difficulty, that the hash value conforms to the mining difficulty; and
   determine, in response that the hash value is determined to be greater than the mining difficulty, that the hash value does not conform to the mining difficulty.

9. A method for packaging blocks of a blockchain implemented in an electronic device comprising:
   identifying whether a packaged block received from a blockchain is valid;
   extracting, in response that the packaged block is identified to be valid, geographic location information of a blockchain node corresponding to the packaged block from a header of the packaged block;
   calculating a mining difficulty of the electronic device according to geographic location information of the electronic device and the geographic location information of the blockchain node, wherein the mining difficulty is a binary integer;
   generating a random number and calculating a hash value according to the random number;
   determining whether the calculated hash value is less than or equal to the mining difficulty;
   storing, in response that the calculated hash value is determined to be less than or equal to the mining difficulty, the geographic location information of the electronic device into a new block; and
   writing the new block into a blockchain.

10. The method according to claim 9, further comprising:
    continuing to generate another random number in response that the hash value is not determined to conform to the mining difficulty, and
    calculating the hash value according to the another random number until the calculated hash value conforms to the mining difficulty.

11. The method according to claim 9, further comprising:
locating the electronic device and obtaining the geographic location information of the electronic device, wherein the geographic location information comprises longitude and latitude information.

12. The method according to claim 9, further comprising:
extracting, in response that the packaged block is identified to be invalid, the geographic location information of a blockchain node corresponding to an immediately-preceding or last valid block.

13. The method according to claim 9, wherein steps of calculating a mining difficulty of the electronic device comprises:
calculating a distance between the electronic device and the blockchain node according to the geographic location information of the electronic device and the geographic location information of the blockchain node; and
calculating the mining difficulty according to the distance between the electronic device and the blockchain node, and a theoretical maximum distance between any two blockchain nodes.

14. The method according to claim 13, wherein steps of calculating a mining difficulty of the electronic device comprises:
calculating the mining difficulty according to an equation Difficulty=$(1-Dist/Dist_{Max})*2^{256}$, wherein Difficulty is the mining difficulty, Dist is the distance between the electronic device and the blockchain node, and Dist-Max is the theoretical maximum distance between the any two blockchain nodes.

15. The method according to claim 9, wherein steps of generating a random number and calculating a hash value according to the random number comprises:
composing a hash value of the packaged block and information of the new block into a character string;
adding the random number to an end of the character string to form a new character string; and
calculating the hash value by performing a hash operation on the new character string.

16. The method according to claim 9, steps of determining whether the calculated hash value conforms to the mining difficulty comprises:
determining whether the hash value is less than or equal to the mining difficulty;
determining, in response that the hash value is determined to be less than or equal to the mining difficulty, that the hash value conforms to the mining difficulty; and
determining, in response that the hash value is determined to be greater than the mining difficulty, that the hash value does not conform to the mining difficulty.

* * * * *